Oct. 22, 1974    R. C. RIBBANS III    3,843,386
COATING OF GLASS FABRIC COATED WITH
AQUEOUS DISPERSION OF POLYMER
Filed Dec. 27, 1972

United States Patent Office 3,843,386
Patented Oct. 22, 1974

3,843,386
COATING OF GLASS FABRIC COATED WITH
AQUEOUS DISPERSION OF POLYMER
Robert Clark Ribbans III, Wilmington, Del., assignor to
E. I. du Pont de Nemours and Company, Wilmington,
Del.
Continuation-in-part of application Ser. No. 217,846, Jan.
12, 1972, now Patent No. 3,790,403. This application
Dec. 27, 1972, Ser. No. 318,901
Int. Cl. B44d 1/20; C03c 15/00, 17/00, 19/00
U.S. Cl. 117—54
3 Claims

ABSTRACT OF THE DISCLOSURE

The dip coating process for applying a polymer coating to textile fabric such as glass fabric via a liquid medium which contains the polymer is improved by flooding a surface of the fabric with the medium prior to dip coating so that wicking of the medium through the thickness of the fabric can occur, which eliminates bubbles in the fabric prior to dip coating. Bubbles that tend to form on the surface of the coating on the surface of the fabric by the dip coating step can be eliminated by flooding both surfaces of the coated fabric with additional polymer-containing medium to wash the bubbles from said surface. Following coating, the coated fabric is then dried and heated above the melting point of the polymer coating. The resultant coated fabric is useful for architectural fabrics and in industrial applications such as for conveyor belts.

---

This application is a continuation-in-part divisional application of U.S. patent application No. 217,846 filed Jan. 12, 1972 by th same inventor and now U.S. Pat. No. 3,790,403.

The present invention relates to apparatus and process for coating textile fabrics with a polymer-containing liquid medium.

The coating of glass fabric with aqueous dispersion of polytetrafluoroethylene is conventionally done in a continuous process of progressively dipping a long length of the glass fabric into a pool of the dispersion, followed by drying and sintering the resultant polymer coating on the fabric. Passage of the glass fabric through the aqueous dispersion leads to the entrapment of bubbles within the resultant coating, which is a problem that increases as the fabric weight increases. The bubbles which become voids in the fused coating lead to exposure of the glass fabric to weathering and the intrusion of material contacting the coated glass fabric, which can lead to failure of the fabric. To avoid bubbles, the dipping operation is conducted at a slow enough rate for the particular dispersion and fabric being used to avoid bubble entrapment, but this has the disadvantage of being uneconomical.

The present invention provides apparatus and process for applying polymer-containing liquid medium to textile fabrics in general, which eliminates the presence of bubbles in the resultant polymer coating on the fabric, leading to better-quality void-free coatings, and to faster, more economical rates of coating. The process improvements are two-fold; first, the textile fabric is contacted with the liquid medium containing the polymer prior to passing through the medium for coating thereby, this prior contact being for the purpose of obtaining wicking of the medium through the thickness of the fabric. This wicking action serves to displace air and thus bubbles from the thickness of the fabric.

The second process improvement which is useful in speeding up the coating operation is aimed at eliminating bubbles from the surface of the coating on the fabric, which bubbles are formed by the froth occurring at the surface of the pool of liquid medium in which the fabric is dipped as the fabric emerges therefrom at high speeds. This improvement involves the process step of contacting both surfaces of the polymer-coated fabric with additional polymer-containing liquid medium in a manner which eliminates such bubbles, which is most conveniently accompanlished by washing the bubbles back into the pool of aqueous dispersion.

The improved coating apparatus of the present invention basically involves apparatus positioned and arranged with the dip coating apparatus to accomplish the pre- and post-contacting hereinbefore described.

The present invention, although applicable to polymer coatings and textile fabrics in general, is especially applicable to applying high quality coatings of polytetrafluoroethylene to glass fabric, and the detailed discussion hereinafter will be directed to these species.

Once the bubbles are eliminated from the polytetrafluoroethylene coating, which is advantageously accomplished by the process and apparatus of the present invention, then the problem of the tendency of microscopic cracks to form in the polytetrafluotoethylene coating upon drying and sintering can be attended to by applying a top coating of melt fabricable tetrafluoroethylene copolymer to the polytetrafluoroethylene coating. This top coating technique and the resultant coated glass fabric is described and claimed in the parent patent application Ser. No. 217,846. The effectiveness of this technique is limited, however, if voids resulting from entrapped bubbles are present in the polytetrafluoroethylene coating, because the voids can expose too much glass fabric for "healing" by the copolymer top coat.

The present invention will be described more fully hereinafter with reference to the drawings in which.

Figure 2:
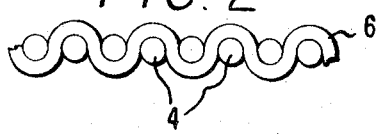
FIG. 2 is a side view of the fabric of FIG. 1.
Figure 6:
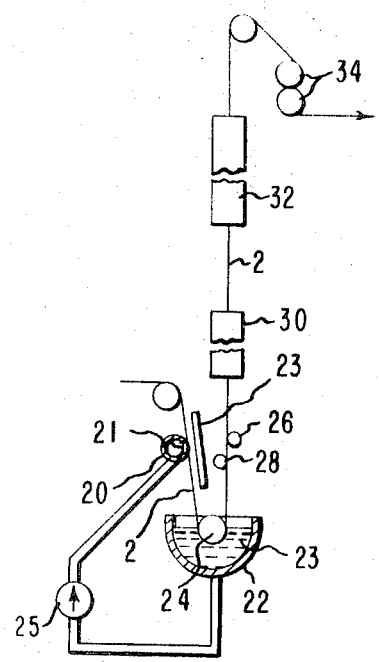
FIG. 6 shows schematically in side elevation one embodiment of improved process and apparatus for coating glass fabric with polytetrafluoroethylene.
Figure 7:
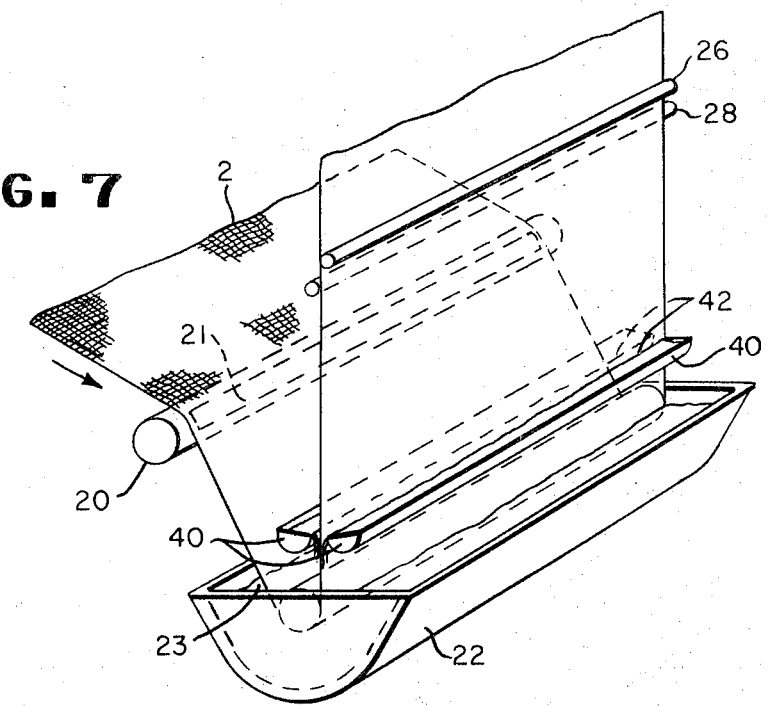
Figure 8:
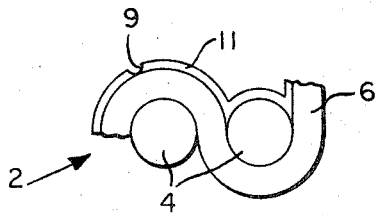

FIG. 7 shows in perspective a portion of the process and apparatus of FIG. 6 and in addition contains another embodiment of improvement of the present invention for eliminating surface bubbles from the coating; and FIG. 8 is an enlarged side view of a portion of the fabric of FIG. 2 having a coating of polytetrafluoroethylene thereon containing a void arising out of bubble entrapment during the coating operation.

Figure 1:
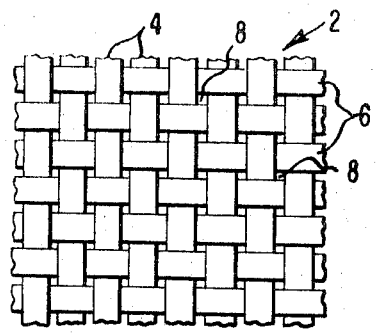
FIG. 1 is a plan view of a piece of woven glass fabric enlarged about 4×.

The glass fabric used in the present invention is any conventional glass fabric wove from glass yarn, illustrated in FIGS. 1 and 2 as fabric 2 containing warp yarn 4 and fill yarn 6. The criss-crossing yarns 4 and 6 form apertures 8 between the yarns. The denier of the yarn and weave of the fabric can be selected to suit the application intended.

The polytetrafluoroethylene coat on the glass fabric is the aqueous dispersion type of polytetrafluoroethylene, sintered after application to the fabric. This type of polytetrafluoroethylene is available in the form of an aqueous dispersion which can conveniently be used to coat the glass fabric. The average particle diameter of the polymer particles in the dispersion are generally between 0.1 to 0.5 micron, preferably at least 0.22 micron and more preferably at least 0.30 micron. The average particle diameter can be determined by the light scattering technique disclosed in U.S. Pat. 3,391,099 to Punderson; if surfactant is present in the dispersion, the refractive index increment is taken as 0.020. Surfactant is usually present in the polytetrafluoroethylene aqueous dispersions in amounts from 1 to 15% by weight based on polytetrafluoroethylene solids to aid in wetting the surfaces to which they are applied. Examples of surfactants are the non-ionic surfactants such as ethoxylated aliphatic alcohols and ethoxylated alkyl phenols, such as polyethylene glycol mono-para-octyl phenyl ether ("Triton X–100") and those represented by the formula $RA_nOH$ wherein $A_n$ is the group $(OC_2H_4)_n$ or a mixture of groups $$(OC_2H_4)_a$$

and $(OC_3H_6)_b$, wherein $n$ in each instance is an integer from 2 to 50, preferably 2 to 18, $b$ is an integer of 0 to 30, and $a$ is an integer of at least 2, $a+b$ being equal to $n$; R is an aliphatic group which can be saturated or unsaturated, straight-chained, branched, or cyclic, and will generally contain from 6 to 24 carbon atoms. A preferred species of surfactant is represented by the formula $$CH_3(CH_2)_n(OCH_2CH_2)_mOH$$

wherein $n$ is an integer of 6 to 10 and $m$ is an interger of 3 to 6. A water soluble silicone block copolymer available as L–77 can also be used as a surfactant.

In the past, glass fabric has been coated by dipping it into polytetrafluoroethylene aqueous dispersion, followed by drying and sintering. Coated fabric was usually redipped, dried and sintered a number of times to build up the desired thickness. The speed at which the fabric entered the dispersion, particularly for the first coat, was limited by the rate at which the dispersion wicked along the fabric length to displace air. Excessive speed resulted in microscopic air bubbles being trapped within the fabric or on the surface of the fabric in the polytetrafluoroethylene coating. The air bubbles, if trapped next to the yarn, prevented coating of the yarn by the polytetrafluoroethylene or if trapped in the coating, the bubbles weakened the coating. In either case, the bubbles led to later intrusion of corrosive elements into the fabric. The bubbles also tended to colonize into patches of foam that detracted from the fabric aesthetics.

The bubble problem was usually overcome by using a dipping rate which did not exceed the rate at which air was displaced from the fabric. The dipping rate (coating speed) could be increased somewhat without attendant bubble entrapment by diluting the polytetrafluoroethylene dispersion with water such as to 25 to 50% solids from the 55 to 65% solids normally supplied. This dilution reduced the viscosity of the dispersion, which increased its wicking rate into the fabric and thus the rate of air displacement from the fabric. This dilution, however, had the disadvantage of decreasing the amount of coating applied per dip of the fabric into the dispersion, thus increasing the number of dips required to obtain a given coating thickness (weight). Moreover, the wicking rate decreases with increasing fabric thickness.

The present invention will be described by first referring to the top coating method in the following section, to which the aforesaid parent application is directed, and then in the subsequent section, by describing the process and apparatus of the present invention which is useful for providing void-free base coatings of polytetrafluoroethylene which can be treated by the top-coating method for healing microscopic cracks in the base coat.

Top Coating to Heal Microscopic Cracks in Polymer Coating

Figure 3:
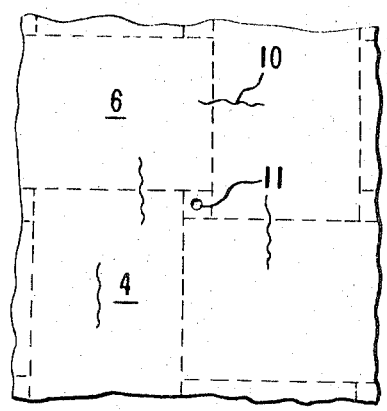
FIG. 3 is a plan view of a portion of the fabric of FIG. 1 in further enlargement and having a coat of polytetrafluoroethylene thereon partially closing the aperture between yarn of the fabric.
Figure 4:
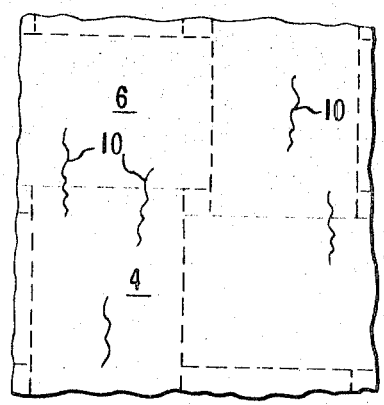
FIG. 4 is a plan view of the coated fabric of FIG. 3 in which further coating with polytetrafluoroethylene has closed the aperture between the yarn.

In any event, whether single or multiple coatings with or without eliminating bubbles or concentrated or dilute dispersions of polytetrafluoroethylene have been used, the result has invariably been the same, i.e., microscopic cracks have formed in the fabric coating on fabrics especially when the fabrics are heavy weight, viz weight at least 8 oz./yd.$^2$ (277 g./m.$^2$) of fabric surface (one surface). The heavy weight fabrics generally have a thickness of at least 8 mils (0.2 mm.). The microscopic cracks in the coating are visible at a magnification of 20×. Lighter weight fabrics can sometimes be coated with crack-free coatings of polytetrafluoroethylene if care is taken in applying the coating and only a very thin coating is applied. The cracks that form in the polytetrofluoroethylene coating are represented by jagged lines 10 shown in FIG. 3 wherein the amount of polytetrafluoroethylene is insufficient to close the aperture 8 between the yarn and thus leaves an opening 11 in the coating which extends through the thickness of the fabric. Typically, the cracks form during drying, and sintering does not completely heal them. Repeated coating of the fabric with polytetrafluoroethylene while filling up the opening 11 does not heal the cracks in the preceding coating and may generate new cracks as shown in FIG. 4. This is especially true for the heavyweight fabrics. The cracking problem is especially severe with the heavyweight fabrics, because the dispersion tends to gravitate toward the warp and fill yarn junctions and apertures 8. Thus, the microscopic cracks tend to start from these regions, but as the coating thickness is increased by the recoating step, the cracks extend over the entire surface of the fabric in a "mud-crack" type of pattern.

It has been the practice in industry to alleviate crack formation by calendering the fabric after coating with polytetrafluoroethylene. This operation is done on dried but unsintered polytetrafluoroethylene. Sintering is done later as an additional operation. The calendering process preforms the dried, unsintered polytetrafluoroethylene into a continuous crack-free coating which, upon sintering, remains crack free. While calendering is generally successful to this end, it has the limitation of not being applicable where it would undesirably distort the glass fabric or where the width of the glass fabric is too great to be handled by available calendering equipment.

The aforesaid parent application is directed to providing crack-free polytetrafluoroethylene coating on glass fabric without requiring calendering. That improvement is obtained by coating the fabric with an aqueous dispersion of polytetrafluoroethylene and drying the dispersion as done heretofore, in which case microscopic cracks form in the dried coating. This polytetrafluoroethylene base coat on the fabric can consist of one or more coatings of polytetrafluoroethylene, depending on the thickness (buildup) of coating desired. Preferably, sufficient base coat is present to fill up the apertures 8 in the fabric.

The polytetrafluoroethylene base coat is made crack free, however, by applying a top coat of melt fabricable tetrafluoroethylene copolymer over the polytetrafluoroethylene base coat. Upon heating the fabric sufficiently to sinter the polytetrafluoroethylene, the copolymer which has a lower melting point also melts and upon cooling fuses to the polytetrafluoroethylene base coat on the fabric at the same time the microscopic cracks in the base coat dissapear. Whether the copolymer merely fills the cracks or actually promotes the cracks to heal themselves during sintering is not certain. What is required is that the copolymer be sufficiently compatible with polytetrafluoroethylene so that the copolymer will bond to polytetrafluoroethylene upon sintering in contact with the copolymer and then cooling.

Description of the top coat as being fused to the base coat means that the top coat was melted in contact with the base coat and upon cooling, bonds thereto. The compatibility of the copolymer for the polytetrafluoroethylene and thus the ability to bond or fuse to the base coat can be characterized as being such as to achieve a peel strength of at least 4 lb./in. (0.7 kg./cm.) of width. Peel strength can be measured using an Instron tensile tester operating at a jaw speed of 10 in./min. (25.4 cm./min.) to peel a fused coating of the copolymer at an angle of about 180° from a sintered coating of the homopolymer. The force required to start the copolymer peeling from the coating, i.e., the breakaway force, is the peel strength. The test samples are one inch (2.54 cm.) wide so that the force read from the tester is in terms of per inch of width.

By melt fabricable is meant that the copolymer can be fabricated by conventional melt processing techniques, such as melt extrusion, which polytetrafluoroethylene is not. In order to be melt fabricable, the copolymer has a specific melt viscosity of less than $10^7$ poises measured at 380° C. under a shear stress of 0.457 kg./cm.$^2$, using the equipment and procedure disclosed in U.S. Pat. No. 2,946,763 to Bro et al. Polytetrafluoroethylene (i.e., the homopolymer) has a specific-melt viscosity in excess of $10^9$ poises under the same conditions.

With due regard for the compatibility requirement of the copolymer for the homopolymer, the copolymer is made by copolymerizing tetrafluoroethylene with at least one other copolymerizable ethylenically unsaturated monomer in a sufficient amount to obtain the melt fabricable condition while still maintaining a high molecular weight copolymer. Generally, a specific-melt viscosity of at least $10^3$ poises under the above conditions is desired for the copolymer. The other monomer content will usually be from 1 to 35 percent based on the weight of the copolymer. The preferred monomers are the perfluoroalkylenes containing at least 3 carbon atoms such as hexafluoropropylene, perfluoro(alkyl vinyl ethers) such as perfluoro(propyl vinyl ether), and perfluoro-(2-methylene-4-methyl-1,3-dioxolane). Copolymers of tetrafluoroethylene and any of these monomers are compatible with the homopolymer.

The melt fabricable tetrafluoroethylene copolymer is conveniently dip coated or otherwise applied to the polytetrafluoroethylene base coat from an aqueous dispersion of the copolymer. This cycle can be repeated as desired to deposit the amount of copolymer required to heal the cracks in the polytetrafluoroethylene base coat. The same surfactants and amounts used in the polytetrafluoroethylene dispersion can be used in the copolymer dispersion.

Figure 5:
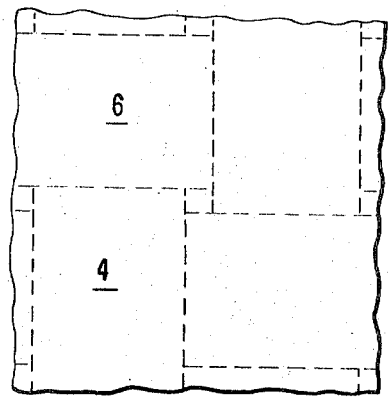
FIG. 5 is a plan view of the fabric of FIG. 4 having a top coat of melt fabricable tetrafluoroethylene copolymer fused to the polytetrafluoroethylene coat.

The melt fabricable tetrafluoroethylene copolymer is preferably applied to the polytetrafluoroethylene coating while the latter is in the unsintered form on the glass fabric because of the greater wettability of the copolymer for unsintered polytetrafluoroethylene. However, the copolymer can also be applied onto the sintered polytetrafluoroethylene base coat if steps are taken to make the copolymer wet the base coat. In any event, the fabric is eventually heated to a temperature at which the polytetrafluoroethylene base coat sinters, which is at least about 342° C. and preferably at least 350° C. for sufficient time to obtain sintering. The resultant coating on the fabric is crack free (under magnification of 20X) and continuous over the surface of the fabric, having the appearance shown in FIG. 5.

This method of healing cracks is useful in obtaining crack-free coatings on all woven glass fabrics having a reasonably tight weave and is especially useful in coating the heavier weight fabrics, i.e., weighing at least 8 oz./yd.$^2$ (277 g./m.$^2$), wherein the cracking problem is the most severe. These heavy weight fabrics, e.g., type 141 fabric which is 8 mils (0.22 mm.) thick, lead to cracking of the polytetrafluoroethylene coating more than the lighter weight fabrics, e.g., 116 fabric, which is 4 mils (.10 mm.) thick, because of the increased roughness or contour of the surface of the thicker fabrics and the increase in size of the apertures between yarn of the fabric. The increased surface roughness of the thicker fabric requires a thicker coat of polytetrafluoroethylene to completely cover the fabric, and polytetrafluoroethylene coatings are known to have a limited thickness (critical thickness) before "mud cracks" form in the dried coating. Typically, the critical thickness of polytetrafluoroethylene coating is less than 2 mils (0.05 mm.) on a smooth surface. The polytetrafluoroethylene applied to the fabric from a dispersion tends to migrate towards the yarn junctions giving increasing thickness to the coating and tendency towards cracking at these junctions as compared to elsewhere on the fabric.

The increased aperture size in thicker fabrics requires a sufficient quantity of polytetrafluoroethylene to fill the apertures. The thicker the fabric, the larger the apertures, and the larger the apertures, the more polytetrafluoroethylene is required to fill the apertures. This demand for polytetrafluoroethylene also leads to cracking of the coating.

Thus, the method of healing cracks is especially useful for coating woven glass fabrics wherein any width dimension of the apertures between yarn of the fabric exceeds the critical thickness of the polytetrafluoroethylene for that particular surface, which means that in order for the apertures to be filled with polytetrafluoroethylene, cracks will be present in the coating for healing by the top coat of melt-fabricable tetrafluoroethylene copolymer according to the present invention. On fabric surfaces, the polytetrafluoroethylene applied from an aqueous dispersion can sometimes span apertures which are as much as 5 mils (0.13 mm.) wide without cracking on drying; this size apertures are found in the type 141 fabric. Except for this borderline heavy weight fabric, the heavy weight fabrics will generally have apertures in which the smallest width dimension is at least 6 mils (0.15 mm.) and thus the method is valuable in healing the cracks in the apertures of these fabrics. The preferred fabrics to be coated according to the method have a thickness of at least 15 mils (0.38 mm.). Usually the fabric thickness will not exceed 30 mils (0.76 mm.) unless the ultimate application for the fabric requires greater fabric thickness. Such preferred fabrics have apertures, the smallest width of which is usually at least 8 mils (0.20 mm.).

Present Invention—Elimination of Bubbles From Polymer Coating

In order for the top coating process described in the preceding section to be of benefit in healing microscopic cracks in the polytetrafluoroethylene coating, the gross discontinuities in the polytetrafluoroethylene coating represented as void 9 in the coating 11 on fabric 2 depicted in FIG. 8 should be eliminated, such voids arising from bubbles entrapped in the polytetrafluoroethylene coating during the dip coating operation. The bubbles appear to come from two sources during passage of the glass fabric through the aqueous dispersion of polymer during the dipping operation. The first source is entrapment of air within the thickness of the fabric if the rate of entry (dip) of the fabric into the dispersion is greater than the rate at which the dispersion wicks along the length of the fabric to displace the air therefrom. The second source of bubbles is when the fabric emerges from the dispersion at such a high rate that frothing occurs at the surface of the pool of dispersion, which frothing is carried out of the pool by the emerging fabric as bubbles in the surface of the coating. Re-coating of the fabric with additional polymer traps these bubbles within the resultant thicker polymer coating, which become voids in such coating.

With respect to alleviating the first source of bubbles, the contacting of the fabric with dispersion prior to dipping into the dispersion as hereinbefore described in the summary of the present invention is obtained by flooding the glass fabric with the polytetrafluoroethylene aqueous dispersion prior to dipping into the dispersion. This prior flooding of a surface of the fabric is done so that wicking occurs in the direction through the thickness of the fabric to displace the air from the thickness of the fabric prior to dip coating. When the fabric is subsequently dipped into the pool of aqueous dispersion of the polymer, wicking of the dispersion along the length of the fabric no longer occurs because the pre-flooding step already filled the fabric with dispersion. Thus, wicking along the length of the fabric is no longer a limitation on the rate of dipping the fabric into the aqueous dispersion.

FIG. 6 shows one method of achieving this flooding action. As the fabric 2 travels to the dip tank 22 containing a pool of aqueous dispersion 23 of polymer, it passes in front of a pipe 20 having a slot-shaped opening 21 facing the fabric. Dispersion is pumped from the tank 22 into the pipe 20 and out the opening 21 into the fabric by pump 25 (the pump can include a filter for the dispersion if desired to filter out larger than desired size particles such as coagulum from the dispersion). Wicking takes place through the fabric thickness and air bubbles emerging from the opposite surface tend to be carried into the dip tank 22 by the flooding action. The porous nature of the fabric allows some dispersion to emerge on the opposite surface of the fabric. A splash board 23 is positioned adjacent the opposite fabric surface and in line with pipe opening 21 to catch dispersion sprayed through the fabric and direct such dispersion into the dip tank. The pipe is positioned with respect to the dip tank 22 such that any excess of dispersion supplied by the pipe can flow by gravity into the tank. The spacing between pipe 20 and dip tank 22 is adjusted so that wicking through the entire thickness of the fabric occurs before the fabric dips into tank 22. Thus, the dip rate does not have to be slowed down commensurate with the wicking rate of the dispersion along the length of the fabric.

In another embodiment of means positioned upstream from the dip tank for contacting or flooding the fabric with dispersion, instead of pumping dispersion through a pipe opening to flood the fabric, the dispersion can be gravity flowed onto a surface of the fabric by passing it beneath an open-bottomed hopper which contains the dispersion.

The path of the fabric 2 in dip tank 22 can be established by a guide roll 24. Subsequent to or downstream from the dip, stationary rods 26 and 28 can be provided adjacent the path of the coated fabric for wiping excess dispersion from the surface of the fabric. Further downstream, the coated fabric passes through a dryer 30 for drying the coating and an oven 32 for heating the coating above its melting point and in the case of polytetrafluoroethylene as the coating, to sinter the coating, with the rate of passage through the entire sequence of equipment being controlled by one or more pull rolls 34 which are driven to pull the fabric through the equipment.

If recoating is desired, this can be done with a series of dip tanks 22 having a dryer 30 and possibly an oven 32 interposed therebetween. In such case, if the interstices of the fabric are already filled with polymer, wicking is no longer a problem and prior flooding is unnecessary. However, if the interstices are not filled with polymer, such as in the case of the fabric of FIG. 3 in which aperture 11 remains, prior flooding is still useful to complete the filling and eliminate bubbles.

With respect to the second potential source of bubbles, occurring at emergence of the fabric from the dip tank, such occurrence will depend on the weight of the fabric, speed of its passage through the dispersion, and on the nature of the aqueous dispersion of polymer (tendency to froth). In other words, conditions can be selected in most cases to avoid frothing, but for a given set of conditions, as the speed of passage is increased to increase production rate, at some speed frothing will occur.

According to the present invention, the contacting of both surfaces of the coated glass fabric downstream of its coating as described hereinbefore is done to eliminate the bubbles that the coated glass fabric picks up from the froth. One embodiment of means for doing this contacting is shown in FIG. 8 as weirs 40 positioned along each surface of the emerging coated glass fabric 2. The weirs 40 are supplied (not shown) with aqueous dispersion 23 such as by the same pump 25 that supplies pipe 20, and the overflow edge 42 of each weir faces the fabric surface so that the aqueous dispersion supplied to the weirs overflows onto and across (transverse direction) each surface of the fabric to, in effect, wash the surface bubbles back into the dip tank by gravity flow along the surfaces of the fabric countercurrent to the direction of travel of the fabric 2 and back into the dip tank.

In this embodiment, the wiper rods 26 and 28 are positioned downstream from the weirs 40 for wiping excess dispersion from the fabric surface.

In each embodiment of the present invention, contacting the fabric with dispersion upstream from the dip tank and downstream from the dip tank, the contacting is done under dispersion flow conditions that do not create bubbles.

The resultant coated glass fabric is useful for conveyor belting and the like when the release surface quality of polytetrafluoroethylene is desired, or can be used in the top coating process hereinbefore described and ultimately as an architectural fabric.

The glass fabric used in the present invention can be in the form of griege goods which means that the yarn of the fabric still has the lubricant coating from its manufacturing process, which enables the yarn to be woven into fabric without rupturing. The usual lubricant coating is a starch-oil composition. During the sintering of the polytetrafluoroethylene coating on the glass fabric the lubricant coating will decompose and darken but this does not harm the physical properties of the coated glass fabric. If it is desired that discoloration be avoided, the starch-oil coating can be removed prior to any coating operation according to the present invention by heating sufficiently to volatilize the lubricant, followed if desired by a washing step. A further alternative is to then apply a lubricant coating to the fabric of sufficient heat stability that it does not decompose during subsequent sintering of the polytetrafluoroethylene. An example of such a coating is a silicone sizing which can be applied by dipping heat cleaned fabric into a bath containing a silicone-emulsion such as Dow Corning ET-4327 silicone emulsion diluted with water to a 1–5 weight percent silicone-solids level, and then drying at an oven temperature of 200–260° C.

By way of example, a glass fabric (35 x 35–150/2/2 warp and fill-2 x 2 basket weave beta glass yarn, fabric weight 415 g./m.$^2$ and being about 0.48 mm. thick with apertures of about 0.25 mm. square) was dipped in 60% solids aqueous dispersion of polytetrafluoroethylene (average particle diameter 0.35 micron and containing 6% by wt.—PTFE basis—of "Triton" X–100 nonionic surfactant) using the flooding technique depicted in FIG. 6 except that an open-bottom hopper was used to flood the fabric with dispersion. Sufficient dispersion was supplied through the open bottom of the hopper to cover the surface of the fabric as it passed beneath the hopper. The distance of thhe fabric path between the open bottom of the hopper and the dispersion in the dip trough was about one foot (30.5 cm.). The speed of the fabric through the equipment was one foot per minute( .5 cm./sec.) and the maximum drying temperature 400° F. (205° C.). The resulting fabric weight was 19.4 oz./yd.$^2$ (671 g./m.$^2$). A second coat of 60% solids polytetrafluoroethylene aqueous dispersion was applied in a similar manner but this time the maximum oven temperature was 700° F. (352° C.), which sintered the polymer. Fabric weight was 23.4 oz./yd.$^2$ (810 g./m.$^2$). Many microscopic cracks appeared in the coating from the exceptionally high coating thickness. A third coat was made similar to the second. The microscopic cracks persisted but not bubbles were visible in any of the polytetrafluoroethylene coats.

Three coats of 30% solids tetrafluoroethylene/hexafluoropropylene copolymer (15–20 weight percent HFP, m.p. 275° C.) aqueous dispersion were applied to seal (heal) the cracks. The aqueous dispersion also contained 1–½% of L–77, a silicone block copolymer wetting agent made by Union Carbide Co., based on the weight of copolymer in the dispersion. The fabric speed was one foot per minute (.5 cm./sec.) and the maximum oven temperature 700° F. (352° C.). No flooding was necessary in applying the copolymer coating because the fabric was sufficiently sealed with polytetrafluoroethylene that wicking no longer occurred. The resulting fabric weighed 24.9 oz./yd.$^2$ (862 g./m.$^2$) and no cracks were observed at 20× magnification.

By way of further example, the general equipment setup of FIG. 7 was used to coat various glass fabrics with polytetrafluoroethylene in a series of experiments. The slot shaped opening 21 in pipe 20 was 5.04 cm. x 91.5 cm. and the weirs were positioned to form a 0.16 cm. gap between overflow edge 42 of each weir 40 and fabric so that the aqueous dispersion flowing over the edges 42 contacted the surface of the coated fabric emerging from dip tank 22. Aqueous dispersion was supplied from the dip tank 22 to each weir at the rate of about 3.8 liters/min. and to pipe 20 at the rate of about 7.6 liters/min. by a single pump. The fabric 2 was in contact with pipe 20 as it passed before the opening 21, whereby the pressure supplying the dispersion to the pipe also served to force the dispersion through the thickness of the fabric, thereby increasing the thickness wicking rate. The ends of the opening 21 terminate just short of the fabric edges so that dispersion does not pass through the opening without contacting the fabric. The aqueous dispersion used contained 54% by weight (total dispersion basis) of polytetrafluoroethylene having an average particle drameter of about 0.35 micron and contained 8% by weight (PTFE basis) of wetting agents to give a dispersion surface tension of 29 dynes/cm. at 22° C. The dispersion had a viscosity of 60 cps. at 22° C. using a Brookfield Viscometer, spindle No. 1 at 60 r.p.m.

(a) In one experiment, the fabric was 116 glass fabric (0.2 oz./yd.$^2$) and the fabric was passed through the apparatus just described at the rate of 9.1 meters/min., followed by drying and baking at temperatures of 150° C. and 342° C., respectively (short of sintering the PTFE). The resultant coated fabric weighed 6.2 oz./yd.$^2$. The coated fabric was calendered and then re-coated twice with the same dispersion by passing the fabric two times through the apparatus of FIG. 7 at the rate of 15.5 meters/min. without using the pre- and post-flooding equipment, followed by sintering at 425° C. after each re-coat, to get a blemish free PTFE-coated glass fabric weighting 7.5 oz./yd.$^2$.

(b) In another experiment, the glass fabric was 128 glass fabric weighing 6.2 oz./yd.$^2$ and two passes of the fabric through the apparatus of FIG. 7 were made, the first at 7.3 meters/min. and the second at 11 meters/min. The resultant PTFE-coated glass fabric weighed 11.7 oz./yd.$^2$ and had a good appearance before calendering.

(c) In still another experiment, the fabric was 151 glass fabric weighing 8.3 oz.&yd.$^2$, and after two coatings as in the preceding experiment, the fabric weight was 16.8 oz./yd.$^2$.

Similar results can be obtained when different polymers are applied in different media to different textile fabrics. For example, the textile fabric can be of natural fiber such as cotton, such a fabric being a cotton twill, or of a synthetic-organic fiber such as high temperature resistant polyamide available e.g. "Nomex" nylon. The medium can be water or an organic liquid and can be a dispersion of the polymer in the liquid medium or a solution of the polymer in the liquid medium, where the medium is a solvent for the polymer. There is no commercially available solvent for the high molecular weight polytetrafluoroethylene used in the present invention, which has a specific melt viscosity of at least $1 \times 10^9$ poises. Examples of other polymers include the melt fabricable tetrafluoroethylene copolymers described hereinbefore, acrylic resin available in aqueous dispersion form as "Lecton" acrylic resin, polyimides available in dissolved precursor form as "Pyre-ML" enamels, and natural and synthetic rubbers most commonly available as rubber latices.

What is claimed is:

1. In the process for coating glass textile fabric with a medium comprising an aqueous dispersion of polytetrafluoroethylene by passing said fabric through said medium, the improvement comprising prior to said passing, flooding one surface of said fabric with said medium to obtain wicking of said medium through the thickness of said fabric prior to said passing.

2. The process of Claim 1 wherein the passing step is conducted by dipping said fabric into said medium.

3. In the process of Claim 1, the additional improvement of contacting both surfaces of said fabric with said medium after the passing step to eliminate bubbles from the coating resulting from said passing step.

References Cited
UNITED STATES PATENTS

| | | | |
|---|---|---|---|
| 2,462,297 | 2/1949 | Adams | 117—113 |
| 2,539,329 | 1/1951 | Sanders | 117—126 GB |
| 2,542,819 | 2/1951 | Kropa | 117—126 GB |
| 2,448,952 | 9/1948 | Berry | 117—126 GB |
| 2,946,698 | 7/1960 | Brunnick et al. | 117—54 |
| 2,972,549 | 2/1961 | Goldsmith | 117—126 GB |
| 3,234,041 | 2/1966 | Rosecrans | 117—140 A |
| 3,790,403 | 2/1974 | Ribbans | 117—54 |

DAVID KLEIN, Primary Examiner

R. L. SCHILLING, Assistant Examiner

U.S. Cl. X.R.

117—113, 126 GB